Nov. 16, 1948.    G. W. McDEARMON    2,453,804
MOLD FOR CONCRETE WEIGHT FOR IRON PIPE LINES
Filed June 25, 1946    3 Sheets-Sheet 1
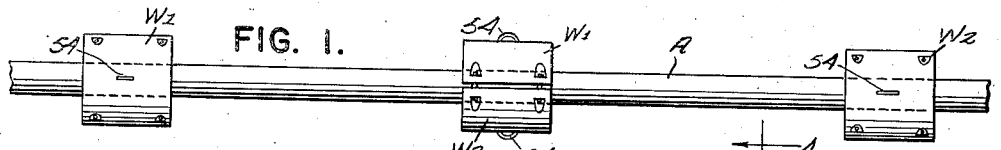
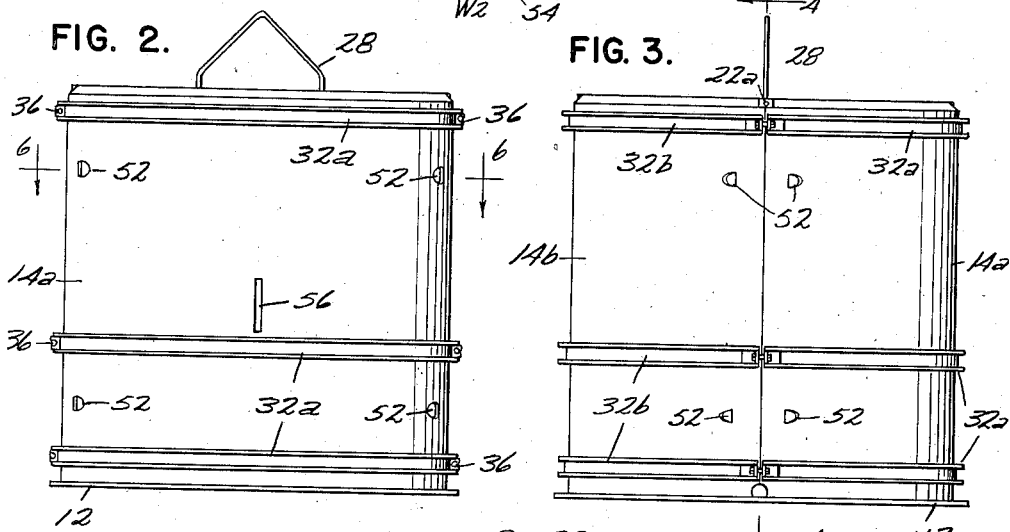
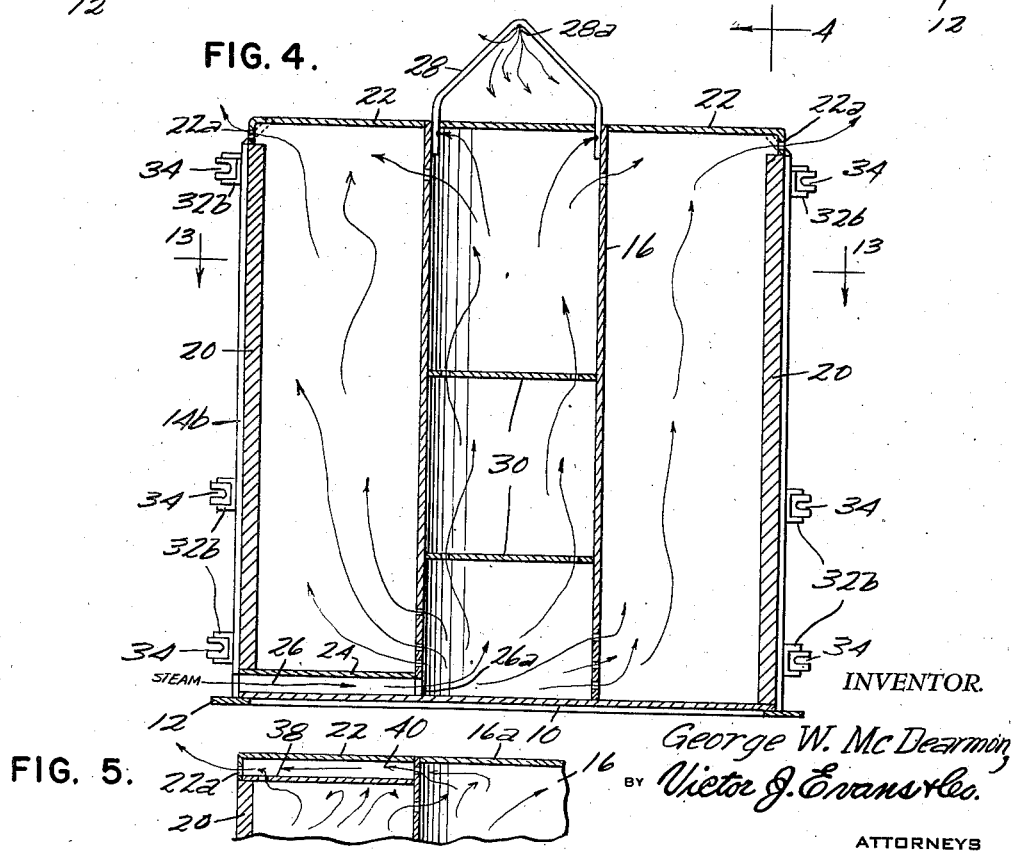
INVENTOR.
George W. McDearmon
BY Victor J. Evans & Co.
ATTORNEYS Nov. 16, 1948.　　　　　G. W. McDEARMON　　　　　2,453,804
MOLD FOR CONCRETE WEIGHT FOR IRON PIPE LINES
Filed June 25, 1946　　　　　　　　　　　　　3 Sheets-Sheet 2

INVENTOR.
George W. McDearmon,
BY Victor J. Evans & Co.
ATTORNEYS

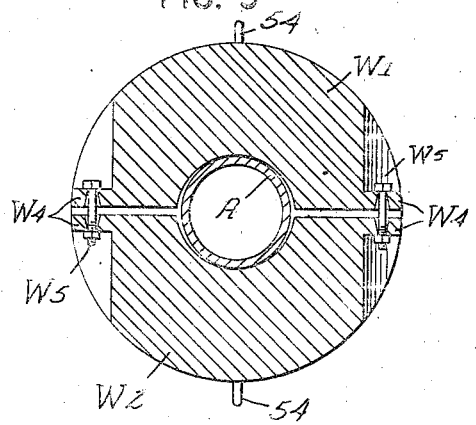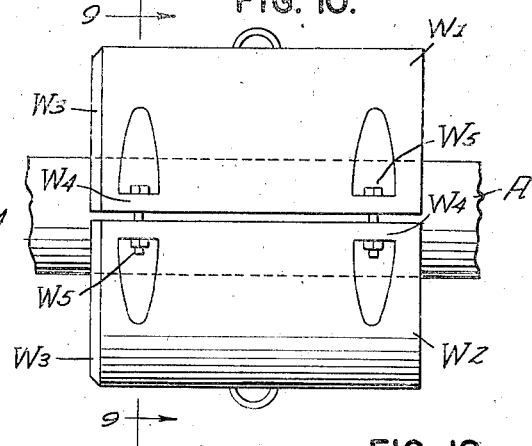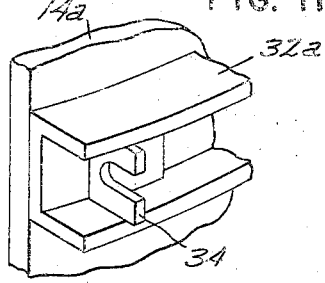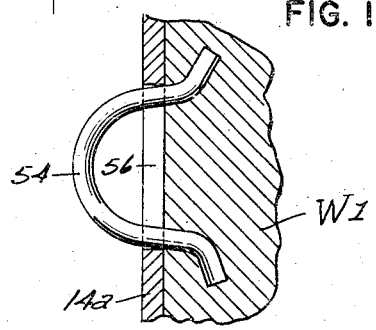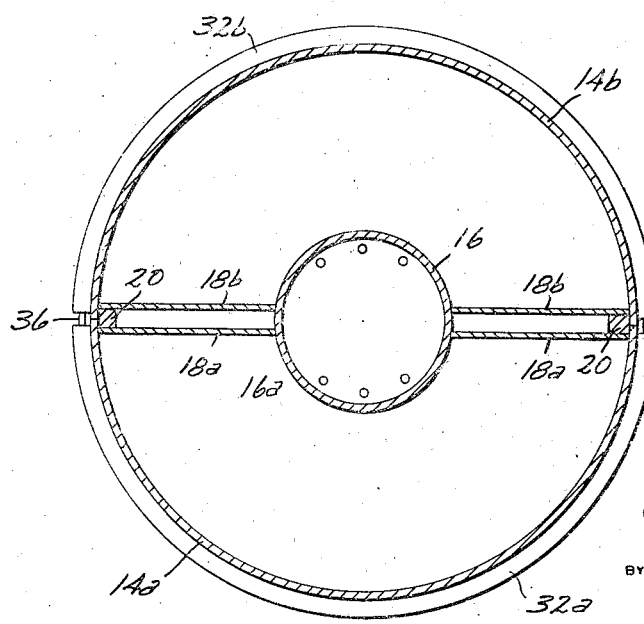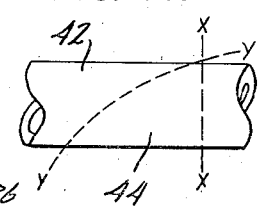

Patented Nov. 16, 1948

2,453,804

UNITED STATES PATENT OFFICE 2,453,804

MOLD FOR CONCRETE WEIGHT FOR IRON PIPE LINES

George W. McDearmon, Baton Rouge, La.

Application June 25, 1946, Serial No. 679,216

4 Claims. (Cl. 25—118)

This invention appertains to a mold for manufacturing articles made from concrete and has for an object to provide one especially designed and constructed for the manufacture of concrete weights for iron pipe lines and for the substitution of the same for the more expensive cast iron weights presently in common use to weight down those portions of pipe lines laid on the beds of bodies of water, such as rivers and the like.

Another object of the invention has to do with the provision of a mold of this kind, which has the advantage in that it can be readily installed at a point convenient to the place of laying a pipe line on the bed of a body of water, for the comparatively quick manufacture and application of the concrete weights, thus avoiding the use of the more costly cast iron weights and the expense of transporting them from more distant points of production.

A further object of the invention lies in the provision of the mold as hereinbefore specified and which embodies certain structural features that permit of the production of a concrete weight in two complemental sections and provide means to allow for the fastening of the sections together and in place on a pipe line, the completed sections being made from a quick setting concrete that is water resistant and of great strength and durability.

Yet another object of the invention is to provide the mold with a novel and efficient arrangement of channels and passages for the steam heating of the concrete mix during the setting period, in order to quicken the set and to assure of the weight sections having a uniformly compact, hard and fine textured finish when ready for removal from the mold.

A still further object of the invention is to make the mold body into two identical sections to be removably clamped in place on a supporting pallet that is carried by a hollow core structure which divides the interior of the body into two weight section forming compartments, the central portion of the core being substantially cylindrical with an external diameter approximating that of the pipe line upon which the finished weight is to be mounted, a bail being secured to the top end of the central portion of the core to facilitate the handling of the mold and its transport from one place of use to another.

With the foregoing and other objects and advantages of equal importance in view, the invention resides in the certain new and useful combination, construction, and arrangement of parts, as will be hereinafter more fully described, set forth in the appended claims, and illustrated in the accompanying drawings, in which:

Figure 1 is a fragmentary section of a pipe line, showing the application of several of the concrete weights thereto;

Figure 2 is an elevational view of the mold assembly;

Figure 3 is an elevational view, taken at right angles to that of Figure 2;

Figure 4 is a vertical section, taken through the line 4—4 on Figure 6, looking in the direction of the arrows;

Figure 5 is a fragmentary sectional detail, showing a modification of the core and partition structure;

Figure 9 is a vertical, transverse section, taken through the line 9—9 on Figure 10, looking in the direction of the arrows;

Figure 10 is an enlarged side view of a fragment of a pipe line, showing one of the weights secured in place thereon;

Figure 11 is an enlarged fragment of the side wall of one of the mold body sections and of the end portion of one of the body clamp bands and showing a bolt receiving element within the channel of the band;

Figure 12 is a fragmentary vertical section of the side wall of one of the mold body sections, showing the manner of applying a carrying bail to a section of a weight during the molding of the weight;

Figure 13 is a top plan view of the mold assembly; and,

Figure 14 is a view of a section of a pipe, showing the manner of cutting the same to form a bolt receiving lug molding element, the mode of the use of which being exemplified in Figures 6, 7 and 8.

Figure 6:
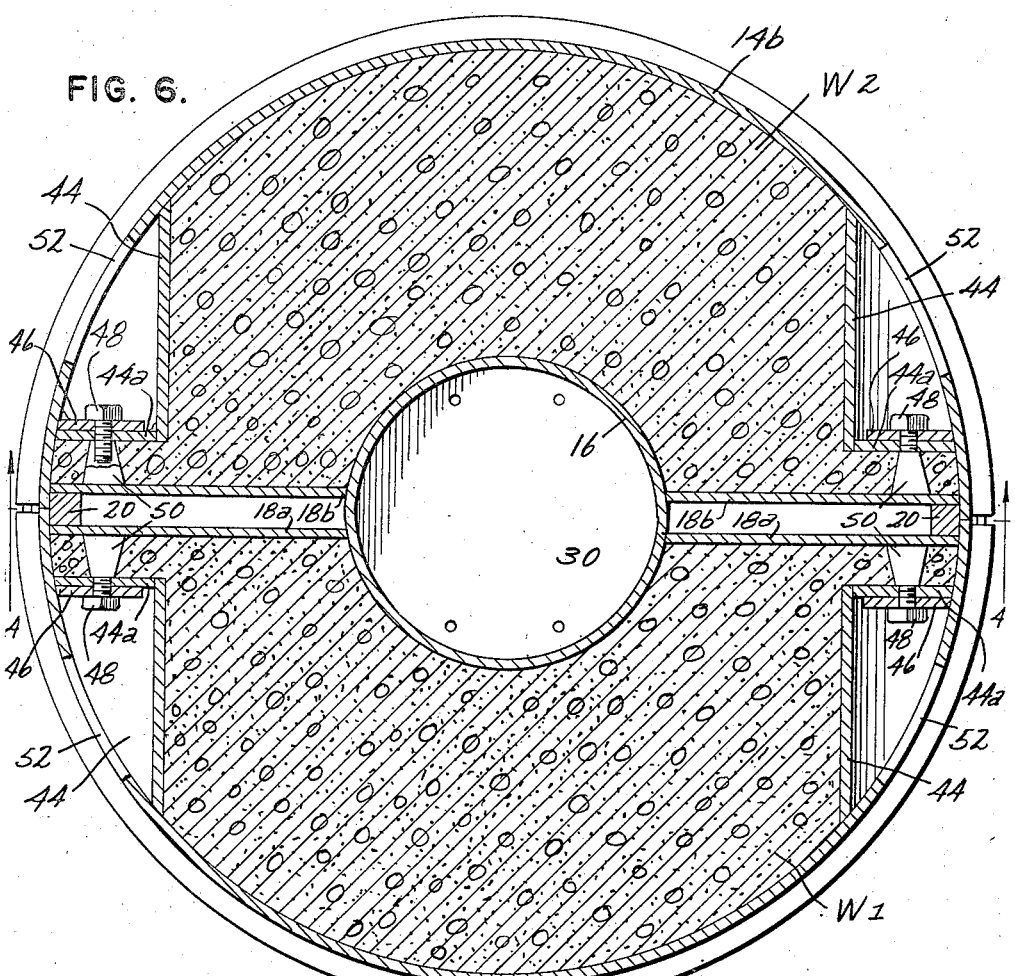
Figure 6 is an enlarged horizontal section, taken through the line 6—6 on Figure 2, looking in the direction of the arrows.

Referring to the drawings in detail, wherein like characters of reference denote corresponding parts throughout the several views, the invention, as it is exemplified therein, is comprised in a base structure, or pallet, made up of a bottom plate 10, preferably in the form of a disk of a comparatively heavy gauge metal, which is disposed concentrically of and welded to an annular member 12, preferably in the form of a flat metal ring.

Removably supported on the pallet is the mold body, in the form of a casing or jacket made in two semi-cylindrical sections 14a and 14b, each having its top edge inwardly angled to bevel the top end edges of the molded weight parts or sections $W^1$ and $W^2$, as at $W^3$, as best shown in Figure 10. When positioned on the pallet, the bottom edges of the body sections 14a, 14b, rest on the annular member 12 and closely hug the edge of the bottom plate 10.

Rising from the center of the bottom plate 10, of the pallet, is a hollow core 16, which is substantially cylindrical in form and has its bottom edge welded to the plate. Extending radially from opposite sides of the core 16 are hollow partitions or wings, each of which is comprised in a pair of spaced walls 18a and 18b that also have their bottom edges welded to the plate 10 and the space between the same closed, at the outer edge portions thereof, by a vertical bar 20, preferably made from relatively heavy metal stock, square in cross-section, and between their top end edges by a strip of sheet metal 22, of substantially the same gauge as that from which the walls are made. Disposed horizontally within the space between the walls 18a and 18b of one of the partitions only, is a strip of metal 24, of the same gauge as that of the strip 22, to form an inlet passage 26 between the same and the bottom plate 10, of the pallet; the passage opening outwardly through the adjacent vertical edges of the body sections 14a, 14b, when the latter are in place on the pallet, for the intake of a fluid heating medium, preferably steam.

The bar 20, of the one partition, has its upper end terminating short of the top closure strip or wall 22 and its lower end welded to the outer end of the bottom strip or wall 24, while in the opposite partition, the bar 20 likewise terminates short of the top closure strip or wall 22 but has its lower end welded direct to the bottom plate 10, of the pallet. The outer ends of each of the strips or walls 22 are downturned and welded to the upper ends of the vertical bars 20, but are vented, as at 22a, to provide outlets for the aforesaid heating medium, the latter passing from the inner end of the inlet passage 26 into the interior of the core 16, through an aperture 26a in the core wall.

The top end of the core 16 is closed by a wall 16a and supports a suspension bail 28 which has its ends projecting downwardly through the end wall 16a for welding to the side wall of the core. Spaced one above the other within the core 16 are at least two baffle plates 30 which are perforated adjacent their margins to permit of the upflow of the heating medium therethrough; the side wall of the core 16 being perforated below the lower of the baffles and similarly above the uppermost baffle to permit the heating medium to enter the otherwise closed spaces within the partitions, the heating medium passing outwardly through the vents 22a at the top ends of the partitions. As best shown in Figure 4, the bail 28 is preferably formed of a length of metal tubing, or pipe, with its ends within the core 16 open to evacuate a portion of the heating medium; an outlet vent 28a being provided at the bend of the bail exteriorly of the core.

The body sections 14a, 14b, are secured in place on the pallet in a manner that the outer sides of the partitions span the joints between the adjacent edges of the sections; the securing means taking the form of at least three bands, each comprising two identical sections 32a, and 32b, preferably made from steel channel bars bent to semi-circular form, with the channels outwardly directed. Welded in the channel of each of the band sections 32a, 32b, adjacent each of the ends thereof, is a substantially U-shaped lug 34, to receive a clamp bolt 36 (Figures 4, 11 and 13); the bolt also spanning the joint between adjacent edges of the body sections.

For the purpose of increasing the more or less tortuous path of flow of the heating medium through the upper portion of the core structure, a modified form of the latter to such end is shown in Figure 5 and, here, radially directed passages 40 are provided in the upper ends of the two partitions, by welding a strip 38, of the sheet metal, within the interior of each of the same; each strip being disposed in the plane of the top ends of the vertical bars 20, forming the outer vertical sides of the partitions, and is perforated adjacent its inner and outer ends for the up-flow of the heating medium through the perforations and into the passages for subsequent discharge outwardly of the vents 22a.

Figures 7, 8:
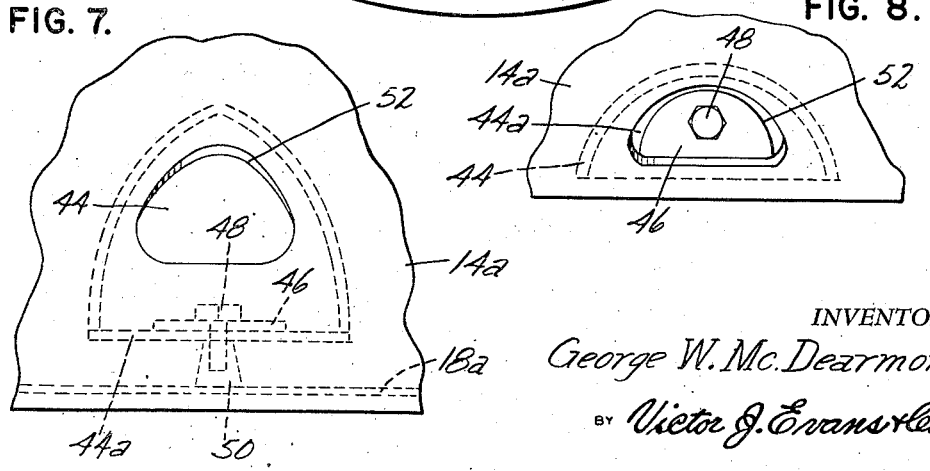
Figure 7 is a view illustrating a fragment of the side wall of one of the mold body sections, and showing the means for forming one of the bolt receiving lugs on a section of a weight, said means being in broken lines.
Figure 8 is a view similar to that of Figure 7, but showing the lug forming means in end elevation.

In order to provide means by which the molded weight sections $W^1$, $W^2$, are to be secured in place on the pipe line A, companion apertured lugs $W^4$ are molded thereon, simultaneously with the molding of the sections themselves, to receive bolts $W^5$ after the manner shown in Figures 1, 9 and 10. For the purpose, a pair of lug forming elements 44 is mounted on the outer sides of the opposite walls 18a, 18b, of each of the core partitions or wings, adjacent the outer vertical side edges thereof, substantially as shown in Figures 6, 7 and 8. Each of these elements 44 is constituted in a part cut from a length of pipe 42, of a suitable diameter, somewhat after the manner shown in Figure 14; one line of cut $x$—$x$ being made crosswise of the pipe and the second $y$—$y$ diagonally thereof, the latter cut having a semi-circular curvature to conform to that of the body sections 14a, 14b.

To mount these elements 44 in place on each of the opposite sides of the core partitions or wings, the crosswise cut end of each of the same is closed by a centrally apertured wall 44a, welded thereto, for engagement over a similarly apertured lug 46, welded on the inner side of a body section 14a, 14b, adjacent a vertical edge thereof; four of the elements and mounting lugs being employed for each half section of the mold, with two spaced apart, one toward the upper and the other toward the lower ends of the same; the elements 44 mounted on one partition or wing being disposed in line with those mounted on the other partition or wing. Each of the elements 44 is secured to a lug 46 by means of a screw 48, threaded into a tapered boss 50, welded on the adjacent side wall 18a, 18b, of the core partitions or wings, substantially as shown in Figure 6; apertures 52 being provided in the wall of each of the body sections 14a, 14b, one in line with each of the lugs 46, for the insertion of a screw 48 therethrough and through the aligned apertures in the end wall 44a, of an element 44, and a lug 46, and into engagement with a boss 50.

To facilitate the handling of each of the weight sections $W^1$, $W^2$, during and after the removal of the same from the mold, a carrying bail 54 is provided in the center of the rounded sides thereof, the ends of the bail being angularly bent and embedded in the concrete during the molding of said sections, while the bent intermediate portion projects outwardly through a slot 56, formed in the wall of each of the body sections 14a, 14b, substantially as shown in Figure 12.

In the assembly and use of the mold, as thus constructed, the body sections 14a, 14b, will be positioned on the pallet in the manner before stated and secured by the clamp bands 32a, 32b, the adjacent ends of which are drawn together by the bolts 36 engaged with the lugs 34. Following this, the elements 44 are secured to the lugs 46 and the bosses 50 by the screws 48, the curved edges of the elements closely hugging the inner sides of the body sections, substantially as shown in Figure 6, and the mold is ready for the pouring of the concrete inwardly of its top end, to either side of the core 16 and its partitions or wings. A heating medium supply connection (not shown) will be made with the inlet of the passage 26, at the bottom of the mold, for the circulation of the medium upwardly through the core 16 and its partitions or wings, in order to expedite the setting of the concrete by the heat transfer through the walls of the latter, the medium being exhausted at the outlets or vents 22a at the top of the mold.

Without further description, it is believed to be obvious that I have provided a practical embodiment of my invention and that its novel features of construction and arrangement will be readily comprehended, as will also be its aim to make possible the lessening of the costs involved in the installation of gas and oil pipe lines. While I have described my invention in a preferred embodiment, it is to be understood that the words which I have used are words of description rather than of limitation, and that changes within the purview of the appended claims may be made without departing from the true scope and spirit of my invention in its broader aspects.

What I claim is:

1. A mold for making articles in half sections to be joined together to form a unit, comprising a pallet, a hollow core rising from the center of said pallet, hollow partitions extending from opposite sides of said core, said core having perforations toward its upper and lower ends to establish communication between its interior and the interiors of said partitions, an inlet for a fluid heating medium opening into the lower end of said core, outlets for said heating medium in the upper ends of said partitions and the top end of said core, and body sections supported on said pallet at opposite sides of said core and said partitions.

2. A mold for making cylindrical articles in half sections to be joined together to form a unit, comprising a circular pallet, a hollow cylindrical core rising from the center of said pallet, hollow partitions extending from opposite sides of said core, said core having perforations toward its upper and lower ends to establish communication between its interior and the interiors of said partitions, an inlet for a fluid heating medium opening into the lower end of said core, outlets for said heating medium in the upper ends of said partitions and the top end of said core, and semi-cylindrical body sections supported on said pallet at opposite sides of said core and said partitions.

3. The invention as in claim 2, with the lower end of said core and the like ends of said partitions welded to said pallet, and a tubular carrying bail welded at the top end of said core and having its ends opening into the interior of the core and a vent opening to atmosphere exteriorly of the core.

4. The invention as in claim 2, with elements removably secured on opposite sides of said partitions and to adjacent portions of said body sections and shaped to cause the molding of bolt receiving lugs on adjacent portions of the half sections of the articles in opposed relation to each other simultaneously with the molding of the latter to receive bolts therein whereby said sections are joined to form a unit.

GEORGE W. McDEARMON.

REFERENCES CITED

The following references are of record in the file of this patent:

UNITED STATES PATENTS

| Number | Name | Date |
| --- | --- | --- |
| 343,281 | Sharpe | June 8, 1886 |
| 1,039,498 | Deslauriers | Sept. 24, 1912 |
| 1,591,060 | Sherrerd | July 6, 1926 |
| 2,180,422 | Lindsay | Nov. 21, 1939 |